(12) United States Patent
Tsai et al.

(10) Patent No.: US 11,165,144 B2
(45) Date of Patent: Nov. 2, 2021

(54) DEVICE ANTENNAS

(71) Applicant: HEWLETT-PACKARD DEVELOPMENT COMPANY, L.P., Houston, TX (US)

(72) Inventors: Ming-Shien Tsai, Taipei (TW); Chi-Chung Ho, Taipei (TW); Hui Fang Cheng, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 658 days.

(21) Appl. No.: 16/075,764

(22) PCT Filed: Apr. 20, 2017

(86) PCT No.: PCT/US2017/028627
§ 371 (c)(1),
(2) Date: Aug. 6, 2018

(87) PCT Pub. No.: WO2018/194621
PCT Pub. Date: Oct. 25, 2018

(65) Prior Publication Data
US 2021/0210844 A1 Jul. 8, 2021

(51) Int. Cl.
*H01Q 1/42* (2006.01)
*H01Q 1/22* (2006.01)
*H01Q 23/00* (2006.01)

(52) U.S. Cl.
CPC ............ *H01Q 1/42* (2013.01); *H01Q 1/2266* (2013.01); *H01Q 23/00* (2013.01)

(58) Field of Classification Search
CPC ......... H01Q 1/42; H01Q 1/2266; H01Q 23/00
See application file for complete search history.

(56) References Cited

U.S. PATENT DOCUMENTS

| | | | |
|---|---|---|---|
| 6,181,284 B1 | 1/2001 | Madsen et al. | |
| 6,741,215 B2 | 5/2004 | Grant et al. | |
| 7,082,324 B2 | 7/2006 | Sawamura | |
| 9,086,299 B2 | 7/2015 | Sanchez | |
| 9,513,672 B2 | 12/2016 | Garelli et al. | |
| 10,736,211 B2 * | 8/2020 | Park ..................... | G06F 1/1652 |

(Continued)

FOREIGN PATENT DOCUMENTS

| | | |
|---|---|---|
| JP | 2008158771 A | 7/2008 |
| WO | 2016179304 A1 | 11/2016 |

OTHER PUBLICATIONS

"HP Envy Laptops", Retrieved from Internet: http://www8.hp.com/us/en/campaigns/envylaptops/overview.html, Jan. 24, 2017, 9 Pages.

*Primary Examiner* — Lam T Mai
(74) *Attorney, Agent, or Firm* — Brooks, Cameron & Huebsch PLLC

(57) ABSTRACT

In one example, systems for a device antennas can include a system, comprising a first base comprising a display, and a second base connected to the first base by a hinge, the second base comprising: a housing comprising a first material for a first area of the housing and a second material for a second area of the housing, wherein the second area of the housing is closer to the hinge than the first area; and a printed circuit board (PCB) coupled to an antenna, wherein the antenna is enclosed within the housing of the second base within the second area.

15 Claims, 3 Drawing Sheets

(56) References Cited

U.S. PATENT DOCUMENTS

| | | | |
|---|---|---|---|
| 2008/0062658 A1* | 3/2008 | Oowaki | H05K 1/028 |
| | | | 361/749 |
| 2013/0033809 A1 | 2/2013 | Schlesener et al. | |
| 2013/0322004 A1* | 12/2013 | Park | G06F 1/1637 |
| | | | 361/679.27 |
| 2014/0184450 A1* | 7/2014 | Koo | H01Q 5/335 |
| | | | 343/702 |
| 2015/0011273 A1 | 1/2015 | Wilmhoff et al. | |
| 2015/0255851 A1 | 9/2015 | Guterman et al. | |
| 2015/0272303 A1* | 10/2015 | Brown | A45C 11/00 |
| | | | 224/191 |
| 2016/0035496 A1 | 2/2016 | Irwin et al. | |
| 2016/0111777 A1 | 4/2016 | Yang | |
| 2016/0261022 A1 | 9/2016 | Guterman et al. | |
| 2017/0141820 A1* | 5/2017 | Kim | H01Q 1/42 |
| 2019/0071907 A1* | 3/2019 | Frank | E05D 7/0423 |
| 2020/0183465 A1* | 6/2020 | Yoo | H01Q 1/2266 |
| 2020/0266524 A1* | 8/2020 | Yoon | H01Q 21/28 |

\* cited by examiner

DEVICE ANTENNAS

BACKGROUND

Antennas can be utilized to couple a transmitter or receiver to an electromagnetic field. In some examples, antennas can be utilized to send and/or receive electromagnetic waves, such as radio waves. In some examples, the electromagnetic waves can be utilized to wirelessly transfer signals. Computing devices can include transmitters and receivers for wireless communication. In some examples, the transmitters and receivers can be connected to one or more antennas for transmitting and/or receiving wireless signals. The transmitters and receivers can enable the computing device to wirelessly communicate with a network and/or other computing devices.

DETAILED DESCRIPTION

Figure 1:
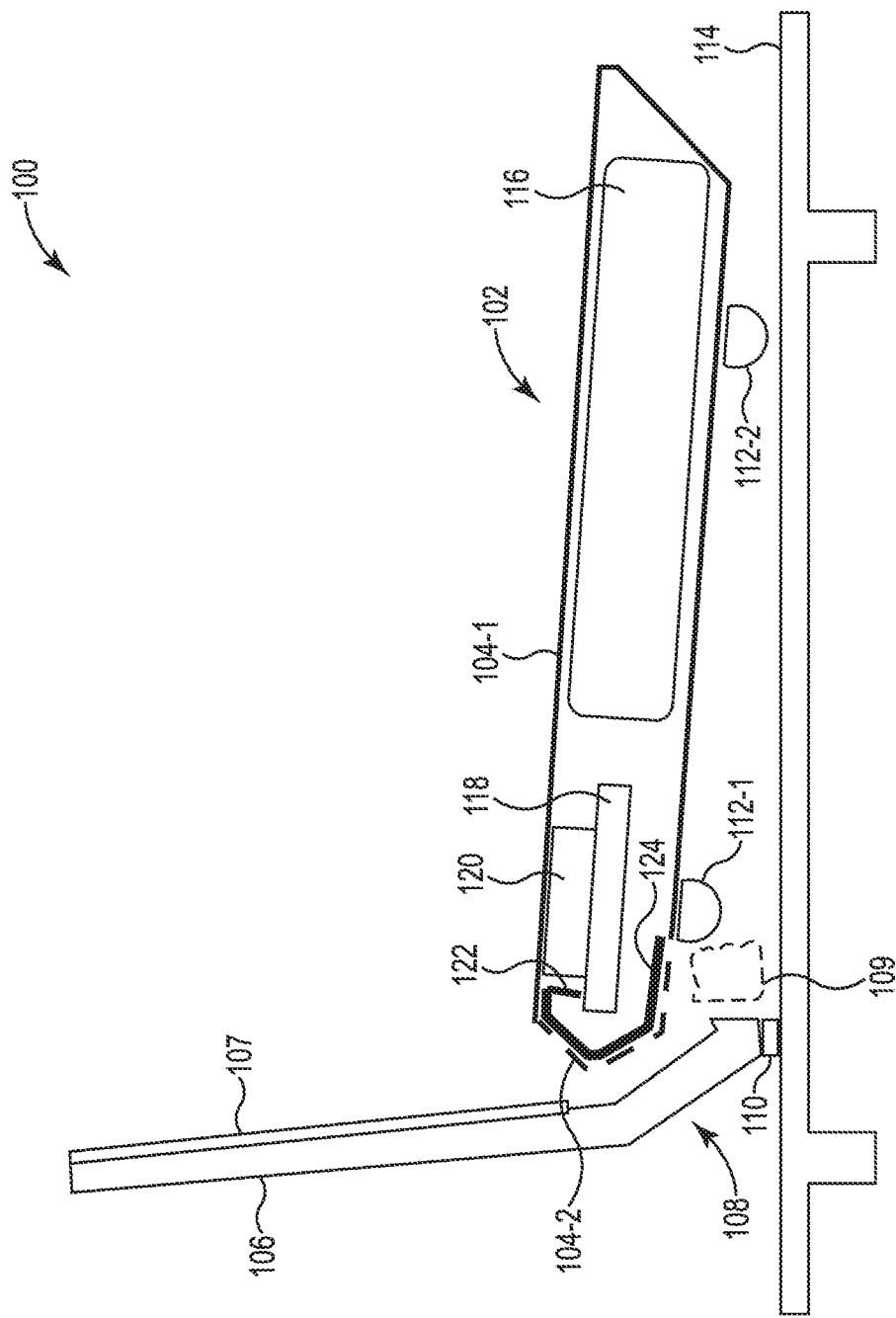
FIG. 1 illustrates an example system for device antennas consistent with the present disclosure.

A number of systems for device antennas can include a system, comprising a first base (e.g., display base) comprising a display, and a second base (e.g., input base, keyboard base, etc.) connected to the first base by a hinge, the second base comprising: a housing comprising a first material for a first area of the housing and a second material for a second area of the housing, wherein the second area of the housing is closer to the hinge than the first area; and a printed circuit board (PCB) coupled to an antenna, wherein the antenna is enclosed within the housing of the second base within the second area.

A location of an antenna within an enclosure of a device can affect the propagation of electromagnetic signals transmitted to the antenna and/or the propagation of electromagnetic signals transmitted by the antenna. For example, previous systems and methods can utilize a flexible connection that is fed through a hinge of a device to position an antenna within a monitor of a computing device such as a laptop computing device. These previous embodiments can position the antenna within the monitor of the laptop computing device to increase a performance of the antenna. For example, previous systems and methods can utilize a base that comprises a metallic material that can limit a performance of the antenna when the antenna is positioned within the base of the laptop computing device.

The device antennas described herein can include a device, such as a laptop computing device, can include a base with an antenna and wireless module within the enclosure of the base without lowering a performance of the antenna. For example, the device antennas described herein can include a base with an enclosure that comprises a first material for a first portion of the enclosure and a second material for a second portion of the enclosure. In this example, the first material can lower a performance of the antenna and the second material may not lower the performance of the antenna. For example, the first material can be a metallic material and the second material can be a polymer material.

The device antennas described herein can include a lift hinge to elevate the base such that the second portion comprising the second material (e.g., polymer material, etc.) is elevated off of a work surface. In these examples, the lift hinge can elevate the portion of the base and/or enclosure that includes the antenna. In some examples, the antenna can be coupled to the second portion comprising the second material to increase a performance of the antenna when the lift hinge elevates the second portion of the base. Thus, the device antenna described herein can provide an increase in performance of the antenna and mitigate the Federal Communications Commission (FCC) specific absorption rate (SAR) influence to the human body without power back-off from a radio circuit, which means it can get better wireless performance without FCC SAR concerns.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates an example system 100 for device antennas consistent with the present disclosure. In some examples, the system 100 can be a computing device. For example, the system 100 can be a laptop computing device that includes an input base 102 and a display base 106. In some examples, the input base 102 and the display base 106 can be connected together by a lift hinge 108. As used herein, a lift hinge 108 can elevate or lift the input base 102 when the system 100 is in an open position (e.g., position illustrated in FIG. 1, position when the display base 106 is rotated about the lift hinge 108 away from the input base 102, etc.).

In some examples, the input base 102 can comprise an enclosure that can include a battery 116, printed circuit board (PCB) 118, wireless module 120, an antenna 124, and/or a connector 122 to couple the antenna 124 to the PCB 118. In some examples, input base 102 can include a keyboard and/or other types of input devices. In some examples, the display base 106 can include a display 107. For example, the display base 106 can include a display 107 that is coupled through the lift hinge 108 to the PCB 118. In some examples, the PCB 118 can generate images to be displayed on the display 107, For example, the PCB 118 can generate a graphical user interface (GUI) to be displayed on the display 107.

As described herein, the lift hinge 108 can elevate the input base 102 of the system 100 above a work surface 114 when the system 100 is in an open position as illustrated in FIG. 1. In some examples, the system can rest on a number of feet 112-1, 112-2 (e.g., rubber feet, rest pads, etc.) when the system is in a closed position. For example, when the display base 106 is rotated on the lift hinge 108 to make contact with the input base 102, the input base 102 can be lowered onto the work surface 114 and can rest on the number of feet 112-1, 112-2. In some examples, the lift hinge 108 can elevate the input base 102 when the display base 106 rotates away from the input base 102. For example, a foot 110 of the lift hinge 108 can make contact with the work surface 114 and elevate the input base 102 away from the work surface 114. In this example, a space 109 can be created between a bottom of the input base 102 and the work surface 114 when the lift hinge 108 elevates the input base 102.

In some examples, the space 109 between the input base 102 and the work surface 114 can increase propagation of electromagnetic signals between the antenna 124 and a different device. For example, the space 109 can allow electromagnetic signals to be transmitted more easily through the input base 102. For example, electromagnetic signals can be more easily transferred through the space 109 compared to being transferred through the work surface 114, especially when the work surface 114 comprises a material that lowers transmission of electromagnetic signals. In some examples, the material of the second portion 104-2 of the input base 102 can allow electromagnetic signals to pass through and the material of the first portion 104-1 can restrict electromagnetic signals.

In some examples, the enclosure of the input base 102 can include a first portion 104-1 that comprises a first type of material and a second portion 104-2 that comprises a second type of material, in some examples, the first portion 104-1 can comprise a metallic material (e.g., aluminum, etc.) and the second portion 104-2 can comprise a polymer material (e.g., plastic, etc.). In some examples, the first material can prevent or partially prevent a transmission of electromagnetic signals and the second material can allow or partially allow the transmission of electromagnetic signals. In some examples, the second portion 104-2 can be the portion of the input base 102 that is elevated by the lift hinge 108. Thus, in some examples, the second type of material and lift hinge 108 can increase a performance of the transmission of electromagnetic signals.

In some examples, the lift hinge 108 can cover the second portion 104-2 when the input base 102 and the display base 106 are in a closed position. For example, when the display base 106 is rotated along the lift hinge 108 into a closed position, the lift hinge 108 can be positioned over the second portion 104-2. In some examples, the second portion 104-2 can comprise a material that is more susceptible to damage compared to a material used for the display base. In these examples, the relatively stronger material of the lift hinge 108 can be utilized to protect the material of the second portion 104-2 when the system 100 is in a closed position.

In some examples, the system 100 can include a PCB 118 enclosed within the input base 102. In some examples, the PCB 118 can be part of a computing device for performing a number of functions (e.g., executing instructions from a non-transitory computer readable medium, generating a GUI for the display 107, etc.). In some examples, the PCB 118 can be connected to a wireless module 120. In addition, the PCB 118 can be connected to an antenna 124 via a connector 122. For example, the antenna 124 can be coupled to the PCB 118 with a pogo pin connection. In this example, the connector 122 can be a pogo pin connection that can include a number of spring loaded pin connectors that can provide an electrical connection between the PCB 118 and the antenna 124.

In some examples, the antenna 124 can be a flexible type of antenna. For example, the antenna 124 can comprise a material that is flexible or moldable to a particular shape. In some examples, the antenna 124 can be positioned along the surface of the second portion 104-2 of the input base 102. For example, the antenna 124 can comprise a flexible material that can be shaped or molded to the interior surface of second portion 104-2. In some examples, the flexible material of the antenna 124 can be shaped or molded to be in contact with an entire surface area of the interior surface of the second portion 104-2 of the input base 102 that comprises the second material as described herein.

As described herein, the second portion 104-2 can be an edge or corner of the input base 102. In some examples, the second portion 104-2 of the input base 102 enclosure can be a rounded portion connected to the lift hinge 108. In these examples, the antenna 124 can be shaped or molded to match the rounded portion of the input base 102 enclosure. For example, the second portion 104-2 can be a curved portion of the input base 102 between a top surface of the input base 102 and a bottom surface of the input base. In this example, the top surface can include a keyboard and/or other input devices for the system 100. In this example, the top surface can be a surface opposite the work surface 114. In this example, the bottom surface can include the feet 112-1, 112-2 and positioned next to the work surface 114.

The system 100 can include an antenna 124 positioned within the input base 102 of the system 100. Positioning the antenna 124 within the input base 102 can eliminate an antenna connection between the input base 102 and the display base 106. For example, previous systems can utilize a flexible connection between a lower base (e.g., input base 102, keyboard base, etc.) and an upper base (e.g., display base 106, user interface base, etc.). In some examples, the flexible connection can be run through a hinge. In these examples, the flexible connections can be damaged and a wireless connection through the antenna can be lost, Thus, the system 100 can provide a more secure connection between the PCB 118 and the antenna 124 compared to previous systems and methods.

Figure 2:
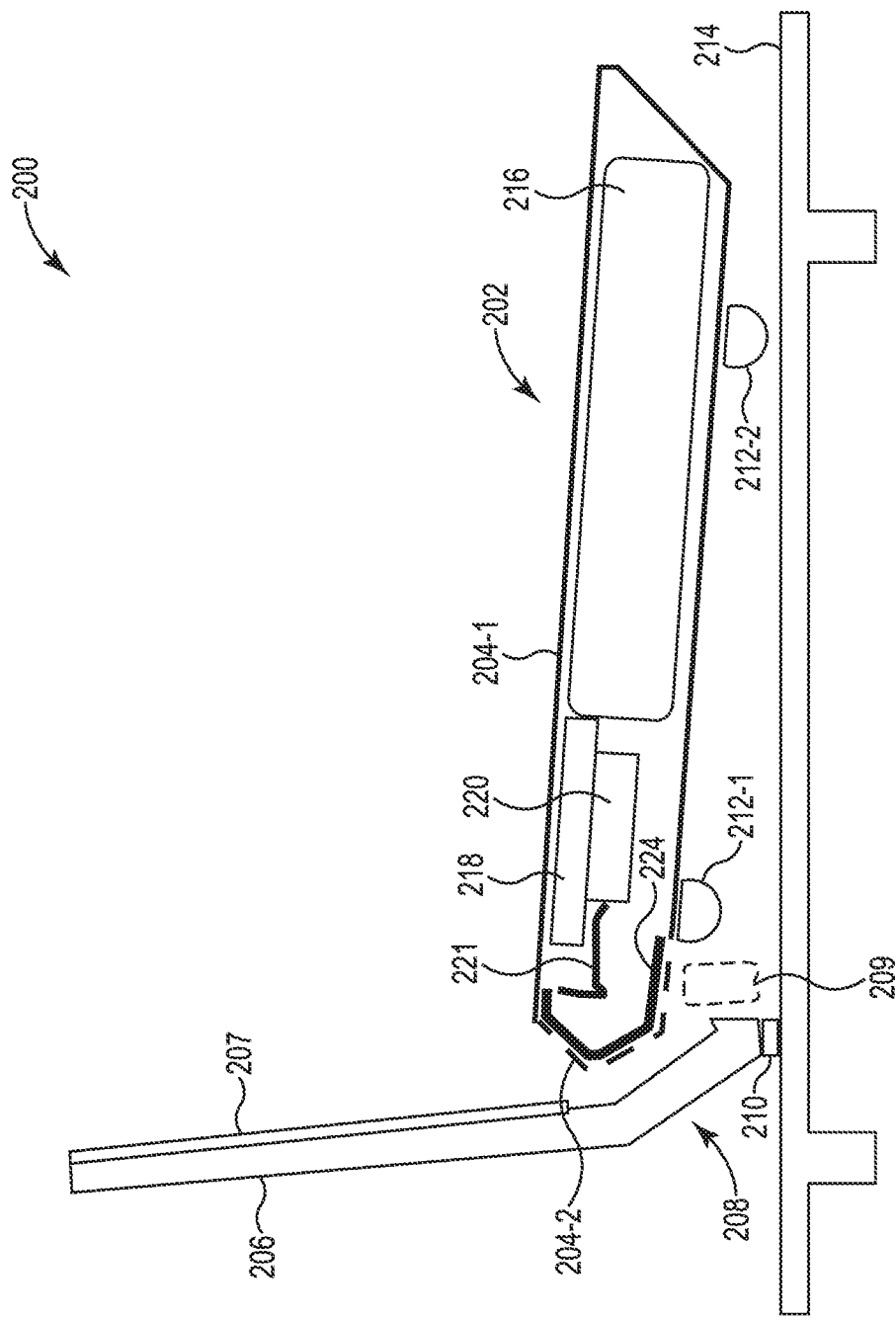
FIG. 2 illustrates an example system for device antennas consistent with the present disclosure.

FIG. 2 illustrates an example system for device antennas consistent with the present disclosure. In some examples, the system 200 can be a computing device. For example, the system 200 can be a laptop computing device that includes an input base 202 and a display base 206. In some examples, the input base 202 and the display base 206 can be connected together by a lift hinge 208. As used herein, a lift hinge 208 can elevate or lift the input base 202 when the system 200 is in an open position (e.g., position illustrated in FIG. 2, position when the display base 206 is rotated about the lift hinge 208 away from the input base 202, etc.).

In some examples, the input base 202 can comprise an enclosure that can include a battery 216, printed circuit board (PCB) 218, wireless module 220, an antenna 224, and/or a connector 222 to couple the antenna 224 to the wireless module 220, In some examples, input base 202 can include a keyboard and/or other types of input devices. In some examples, the display base 206 can include a display 207, For example, the display base 206 can include a display 207 that is coupled through the lift hinge 208 to the PCB 218, In some examples, the PCB 218 can generate images to be displayed on the display 207. For example, the PCB 218 can generate a graphical user interface (GUI) to be displayed on the display 207.

As described herein, the lift hinge 208 can elevate the input base 202 of the system 200 above a work surface 214 when the system 200 is in an open position as illustrated in FIG. 2. In some examples, the system can rest on a number of feet 212-1, 212-2 (e.g., rubber feet, rest pads, etc.) when the system is in a closed position. For example, when the display base 206 is rotated on the lift hinge 208 to make contact with the input base 202, the input base 202 can be lowered onto the work surface 214 and can rest on the number of feet 212-1, 212-2, In some examples, the lift hinge 208 can elevate the input base 202 when the display base 206 rotates away from the input base 202. For example, a foot 210 of the lift hinge 208 can make contact with the work surface 214 and elevate the input base 202 away from the work surface 214. In this example, a space 209 can be created between a bottom of the input base 202 and the work surface 214 when the lift hinge 208 elevates the input base 202.

In some examples, the space 209 between the input base 202 and the work surface 214 can increase propagation of electromagnetic signals between the antenna 224 and a different device. For example, the space 209 can allow electromagnetic signals to be transmitted more easily through the input base 202. In some examples, the material of the second portion 204-2 of the input base 202 can allow electromagnetic signals to pass through and the material of the first portion 204-1 can restrict electromagnetic signals.

In some examples, the enclosure of the input base 202 can include a first portion 204-1 that comprises a first type of material and a second portion 204-2 that comprises a second type of material. In some examples, the first portion 204-1 can comprise a metallic material (e.g., aluminum, etc.) and the second portion 204-2 can comprise a polymer material (e.g., plastic, etc.). In some examples, the first material can prevent or partially prevent a transmission of electromagnetic signals and the second material can allow or partially allow the transmission of electromagnetic signals. In some examples, the second portion 204-2 can be the portion of the input base 202 that is elevated by the lift hinge 208. Thus, in some examples, the second type of material and lift hinge 208 can increase a performance of the transmission of electromagnetic signals.

In some examples, the system 200 can include a PCB 218 and a wireless module 220 enclosed within the input base 202. In some examples, the PCB 218 can be part of a computing device for performing a number of functions (e.g., executing instructions from a non-transitory computer readable medium, generating a GUI for the display 207, etc.). In some examples, the PCB 218 can be connected to a wireless module 220. In some examples, the wireless module 220 can be connected to the antenna 224 via connector 222. For example, the antenna 224 can be coupled to the wireless module 220 with a pogo pin connection. In this example, the connector 222 can be a pogo pin connection that can include a number of spring loaded pin connectors that can provide an electrical connection between the wireless module 220 and the antenna 224.

In some examples, the antenna 224 can be a flexible type of antenna. For example, the antenna 224 can comprise a material that is flexible or moldable to a particular shape. In some examples, the antenna 224 can be positioned along the surface of the second portion 204-2 of the input base 202. For example, the antenna 224 can comprise a flexible material that can be shaped or molded to the interior surface of second portion 204-2. In some examples, the flexible material of the antenna 224 can be shaped or molded to be in contact with an entire surface area of the interior surface of the second portion 204-2 of the input base 202 that comprises the second material as described herein.

As described herein, the second portion 204-2 can be an edge or corner of the input base 202. In some examples, the second portion 204-2 of the input base 202 enclosure can be a rounded portion connected to the lift hinge 208. In these examples, the antenna 224 can be shaped or molded to match the rounded portion of the input base 202 enclosure. For example, the second portion 204-2 can be a curved portion of the input base 202 between a top surface of the input base 202 and a bottom surface of the input base. In this example, the top surface can include a keyboard and/or other input devices for the system 200. In this example, the top surface can be a surface opposite the work surface 214. In this example, the bottom surface can include the feet 212-1, 212-2 and positioned next to the work surface 214.

The system 200 can include an antenna 224, coupled to a wireless module 220, positioned within the input base 202 of the system 200. Positioning the antenna 224 and the wireless module 220 within the input base 202 can eliminate an antenna connection between the input base 202 and the display base 206. For example, previous systems can utilize a flexible connection between a lower base (e.g., input base 202, keyboard base, etc.) and an upper base (e.g., display base 206, user interface base, etc.). In some examples, the flexible connection can be run through a hinge. In these examples, the flexible connections can be damaged and a wireless connection through the antenna can be lost. Thus, the system 200 can provide a more secure connection between the wireless module 220 and the antenna 224 compared to previous systems and methods.

Figure 3:
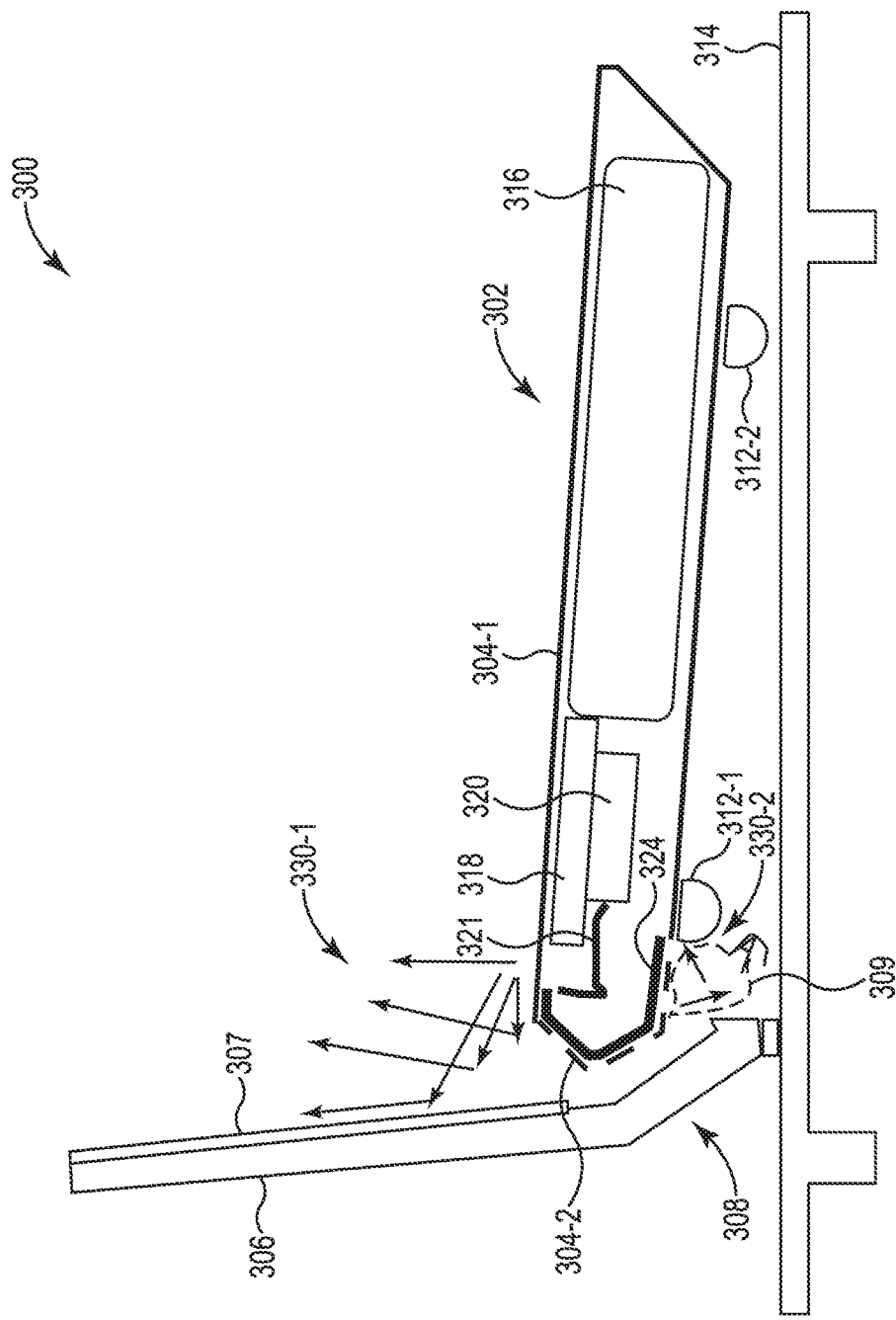
FIG. 3 illustrates an example system for device antennas consistent with the present disclosure.

FIG. 3 illustrates an example system 300 for device antennas consistent with the present disclosure. In some examples, the system 300 can be a computing device. For example, the system 300 can be a laptop computing device that includes an input base 302 and a display base 306. In some examples, the input base 302 and the display base 306 can be connected together by a lift hinge 308. As used herein, a lift hinge 308 can elevate or lift the input base 302 when the system 300 is in an open position (e.g., position illustrated in FIG. 3, position when the display base 306 is rotated about the lift hinge 308 away from the input base 302, etc.).

FIG. 3 can illustrate an example of electromagnetic signals 330-1 being transmitted through a second portion 304-2 of the input base 302 and being reflected by a display 307 of the display base 306. In addition, FIG. 3 can illustrate an example of electromagnetic signals 330-2 being transmitted through a second portion 304-2 of the input base 302 into a space 309 that is created by the lift hinge 308 as described herein. As described herein, the electromagnetic signals 330-1, 330-2 can be wireless communication signals. In some examples, the electromagnetic signals 330-1, 330-2 can be transmitted and received through the second portion 304-2 of the input base 302 at a greater intensity compared to previous systems and methods.

In some examples, the input base 302 can comprise an enclosure that can include a battery 316, printed circuit board (PCB) 318, wireless module 320, an antenna 324, and/or a connector 322 to couple the antenna 324 to the wireless module 320. In some examples, input base 302 can include a keyboard and/or other types of input devices. In some examples, the display base 306 can include a display 307, For example, the display base 306 can include a display 307 that is coupled through the lift hinge 308 to the PCB 318. In some examples, the PCB 318 can generate images to be displayed on the display 307. For example, the PCB 318 can generate a graphical user interface (GUI) to be displayed on the display 307.

As described herein, the lift hinge 308 can elevate the input base 302 of the system 300 above a work surface 314 when the system 300 is in an open position as illustrated in FIG. 3. In some examples, the system can rest on a number of feet 312-1, 312-2 (e.g., rubber feet, rest pads, etc.) when the system is in a closed position. For example, when the display base 306 is rotated on the lift hinge 308 to make contact with the input base 302, the input base 302 can be lowered onto the work surface 314 and can rest on the number of feet 312-1, 312-2. In some examples, the lift hinge 308 can elevate the input base 302 when the display base 306 rotates away from the input base 302. For example, a foot 310 of the lift hinge 308 can make contact with the work surface 314 and elevate the input base 302 away from the work surface 314. In this example, a space 309 can be created between a bottom of the input base 302 and the work surface 314 when the lift hinge 308 elevates the input base 302.

In some examples, the space 309 between the input base 302 and the work surface 314 can increase propagation of electromagnetic signals between the antenna 324 and a different device. For example, the space 309 can allow electromagnetic signals to be transmitted more easily through the input base 302. In some examples, the material of the second portion 304-2 of the input base 302 can allow electromagnetic signals to pass through and the material of the first portion 304-1 can restrict electromagnetic signals.

In some examples, the enclosure of the input base 302 can include a first portion 304-1 that comprises a first type of material and a second portion 304-2 that comprises a second type of material. In some examples, the first portion 304-1 can comprise a metallic material (e.g., aluminum, etc.) and the second portion 204-2 can comprise a polymer material (e.g., plastic, etc.). In some examples, the first material can prevent or partially prevent a transmission of electromagnetic signals and the second material can allow or partially allow the transmission of electromagnetic signals. In some examples, the second portion 304-2 can be the portion of the input base 302 that is elevated by the lift hinge 308. Thus, in some examples, the second type of material and lift hinge 308 can increase a performance of the transmission of electromagnetic signals.

In some examples, the system 300 can include a PCB 318 and a wireless module 320 enclosed within the input base 302. In some examples, the PCB 318 can be part of a computing device for performing a number of functions (e.g., executing instructions from a non-transitory computer readable medium, generating a GUI for the display 307, etc.). In some examples, the PCB 318 can be connected to a wireless module 320. In some examples, the wireless module 320 can be connected to the antenna 324 via connector 322. For example, the antenna 324 can be coupled to the wireless module 320 with a pogo pin connection. In this example, the connector 322 can be a pogo pin connection that can include a number of spring loaded pin connectors that can provide an electrical connection between the wireless module 320 and the antenna 324.

In some examples, the antenna 324 can be a flexible type of antenna. For example, the antenna 324 can comprise a material that is flexible or moldable to a particular shape. In some examples, the antenna 324 can be positioned along the surface of the second portion 304-2 of the input base 302. For example, the antenna 324 can comprise a flexible material that can be shaped or molded to the interior surface of second portion 304-2. In some examples, the flexible material of the antenna 324 can be shaped or molded to be in contact with an entire surface area of the interior surface of the second portion 304-2 of the input base 302 that comprises the second material as described herein.

As described herein, the second portion 304-2 can be an edge or corner of the input base 302. In some examples, the second portion 304-2 of the input base 302 enclosure can be a rounded portion connected to the lift hinge 308. In these examples, the antenna 324 can be shaped or molded to match the rounded portion of the input base 302 enclosure. For example, the second portion 304-2 can be a curved portion of the input base 302 between a top surface of the input base 302 and a bottom surface of the input base. In this example, the top surface can include a keyboard and/or other input devices for the system 300. In this example, the top surface can be a surface opposite the work surface 314. In this example, the bottom surface can include the feet 312-1, 312-2 and positioned next to the work surface 314.

The system 300 can include an antenna 324, coupled to a wireless module 320, positioned within the input base 302 of the system 300. Positioning the antenna 324 and the wireless module 320 within the input base 302 can eliminate an antenna connection between the input base 302 and the display base 306. For example, previous systems can utilize a flexible connection between a lower base (e.g., input base 302, keyboard base, etc.) and an upper base (e.g., display base 306, user interface base, etc.), In some examples, the flexible connection can be run through a hinge. In these examples, the flexible connections can be damaged and a wireless connection through the antenna can be lost. Thus, the system 300 can provide a more secure connection between the wireless module 320 and the antenna 324 compared to previous systems and methods.

The above specification, examples and data provide a description of the method and applications, and use of the system and method of the present disclosure. Since many examples can be made without departing from the spirit and scope of the system and method of the present disclosure, this specification merely sets forth some of the many possible example configurations and implementations.

What is claimed:

1. A system, comprising:
   a first base comprising a display;
   a second base connected to the first base by a hinge, the second base comprising:
   a housing comprising a first material for a first area of the housing and a second material for a second area of the housing, wherein the second area of the housing is closer to the hinge than the first area; and
   a printed circuit board (PCB) coupled to an antenna, wherein the antenna is enclosed within the housing of the second base within the second area and in contact with an interior surface of the second material.

2. The system of claim 1, wherein the hinge is a lift hinge to elevate the second area of the housing.

3. The system of claim 2, wherein the lift hinge covers the second area when the first base and the second base are in a closed position.

4. The system of claim 1, wherein first material is a metal material and the second material is a polymer material.

5. The system of claim 1, comprising a wireless module coupled to the PCB that is enclosed within the housing of the second base.

6. A device, comprising:
   a first base;
   a second base comprising:
   an enclosure with a first portion comprising a first material that is a metal material and a second portion comprising a second material that is a polymer material;
   a printed circuit board enclosed within the enclosure; and
   an antenna coupled to the printed circuit board (PCB) enclosed within the second portion of the enclosure; and
   a lift hinge, connecting the first base to the second base, to elevate the second base when the device is in an open position.

7. The device of claim 6, wherein the antenna is a flexible type antenna coupled to the second material.

8. The device of claim 7, wherein the second material allows electromagnetic signals to pass through and the first material restricts electromagnetic signals.

9. The device of claim 6, wherein the antenna is coupled to the PCB with a pogo pin connection.

10. The device of claim 6, wherein the second portion of the enclosure is a rounded portion connected to the lift hinge.

11. The device of claim 10, wherein the antenna is coupled along the rounded portion connected to the lift hinge.

12. A system, comprising:
   a computing base connected to a lift hinge;
   an enclosure to enclose the computing base, wherein the enclosure includes a first portion comprising a first material that restricts electromagnetic signals and a second portion comprising a second material that allows electromagnetic signals to pass through; and
   a printed circuit board (PCB) coupled to an antenna within the enclosure, wherein the antenna is a flexible type antenna coupled to an interior surface of the enclosure along the second material.

13. The system of claim 12, wherein the second portion comprising the second material is an edge of the enclosure coupled to the lift hinge.

14. The system of claim 12, wherein the antenna is in contact with an entire surface area of the interior surface of the second material.

15. The system of claim 12, comprising a display base connected to the lift hinge to reflect electromagnetic signals from the antenna.

\* \* \* \* \*